United States Patent
Lippert et al.

[11] Patent Number: 6,031,057
[45] Date of Patent: Feb. 29, 2000

[54] POLYMERS OF OLEFINICALLY UNSATURATED MONOMERS

[75] Inventors: Ferdinand Lippert, Bad Dürkheim; Arthur Höhn, Kirchheim; Eckard Schauss, Heuchelheim, all of Germany

[73] Assignee: BASF Aktiengesellschaft, Ludwigshafen, Germany

[21] Appl. No.: 08/952,440

[22] PCT Filed: May 9, 1996

[86] PCT No.: PCT/EP96/01964

§ 371 Date: Nov. 20, 1997

§ 102(e) Date: Nov. 20, 1997

[87] PCT Pub. No.: WO96/37522

PCT Pub. Date: Nov. 28, 1996

[30] Foreign Application Priority Data

May 22, 1995 [DE] Germany .......................... 195 18 736

[51] Int. Cl.[7] ...................................................... C08F 4/80
[52] U.S. Cl. .......................... 526/171; 526/170; 526/172; 526/161
[58] Field of Search .................................. 526/170, 171, 526/172, 145, 147, 135; 502/213, 155

[56] References Cited

U.S. PATENT DOCUMENTS

| | | | |
|---|---|---|---|
| 3,051,694 | 8/1962 | Meriwether et al. | 526/171 |
| 5,373,071 | 12/1994 | Drent et al. | 526/93 |

FOREIGN PATENT DOCUMENTS

| | | |
|---|---|---|
| 0 454 231 | 10/1991 | European Pat. Off. . |
| 454 231 | 10/1991 | European Pat. Off. . |
| 589 527 | 3/1994 | European Pat. Off. . |
| 589 527 A1 | 3/1994 | European Pat. Off. . |
| 0 610 601 | 8/1994 | European Pat. Off. . |
| 610 601 | 8/1994 | European Pat. Off. . |

OTHER PUBLICATIONS

J. Am. Chem. Soc. 1995, 117, pp. 6414–6415, Johnson et al., "New Pd and Ni–based catalysts for polymerization of Ethylene and α–olefins."

Grant et al., Grant & Hackh's Chemical Dictionary, McGraw–Hill, p. 337, 1987.

W. Keim, R. Appel, A. Storeck, C. Kruger and R. Goddard, Angew. Chem. Int. Ed. Eng. 20 (1981) No. 1, pp. 116–117, "Novel Nickel and Palladium Complexes with aminobis(imino)phosphorane Ligands for the Polymerization of Ethylene."

*Primary Examiner*—David W. Wu
*Assistant Examiner*—Roberto Rabago
*Attorney, Agent, or Firm*—Keil & Weinkauf

[57] ABSTRACT

Polymers are obtained by polymerising olefinically unsaturated monomers in the presence of a metal complex having the general formula (I), in which the substituents and indexes have the following meanings: M is a metal of group VIIIB of the periodic table of elements; $E^1$, $E^2$ stand for an element of group VA of the periodic table of elements; Z is a bridging structural unit made of one, two or three substructural units of elements of groups IVA, VA, VIA of the periodic table of elements; $R^1$ to $R^4$ stand for substituents selected in the group that consists of $C_1$–$C_{20}$ organic carbon residues and $C_3$–$C_{30}$ organic silicium residues which may contain one or several elements of groups IVA, VA, VIA and VIIA of the periodic table of elements; $L^1$, $L^2$ stand for formally charged or neutral ligands; X stands for monovalent or polyvalent anions; p equals 0, 1 or 2; m, n equal 0, 1 or 2, whereas p=m×n.

(I)

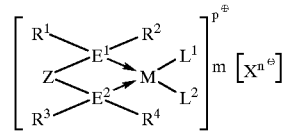

5 Claims, No Drawings

POLYMERS OF OLEFINICALLY UNSATURATED MONOMERS

The present invention relates to a process for preparing polymers of olefinically unsaturated monomers by polymerization of unsaturated monomers in the presence of a metal complex of the general formula (I)

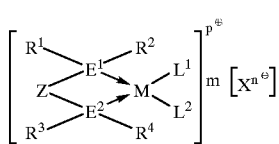

where the substituents and indices have the following meanings:

M is a metal from group VIIIB of the Periodic Table of the Elements, $E^1$, $E^2$ are each an element from group VA of the Periodic Table of the Elements, Z is a bridging structural unit having a bridging atom from group IVA, VA or VIA of the Periodic Table of the Elements, $R^1$ to $R^4$ are substituents selected from the group consisting of $C_1$–$C_{20}$-organic and $C_3$–$C_{30}$-organosilicon radicals, where the radicals can contain one or more elements of groups IVA, VA, VIA and VIIA of the Periodic Table of the Elements, $L^1$, $L^2$ are formally charged or neutral ligands, X is a monovalent or polyvalent anion, p is 0, 1 or 2, m, n are 0, 1 or 2, where p=m×n.

The polymerization of olefinically unsaturated monomers, for example of ethylene, $C_3$–$C_8$-alk-1-enes and acrylic acid derivatives, is well known for different polymerization processes, and the polyolefins obtainable are widely used commercially in many fields of application, for example as films, moldings and fibers.

The polymerization of the olefins is catalyzed or initiated, inter alia, by mixed catalysts comprising compounds of the early transition metals (titanium, zirconium, etc) and alkyl compounds of the main group metals (eg. aluminum alkyls), known as Ziegler catalysts, or else by means of free-radical initiators.

However, Ziegler catalysts have some disadvantages. They usually react, sometimes very vigorously, with moisture and oxygen, generally losing their catalytic activity.

Furthermore, these catalysts are generally not able to (co)polymerize unsaturated compounds containing functional groups such as carboxylic acid groups or ester groups.

In addition, the polymerization of cyclic, olefinically unsaturated monomers or olefinically polyunsaturated, linear monomers often does not proceed in the desired manner, namely as a polyinsertion reaction, but results in secondary reactions such as ring opening of the cyclic monomers or ring formation of the linear monomers. The polymers thus formed have high nonuniformity both of the chemical composition and of the molecular weight distribution.

Free-radical initiators are generally able, under high pressure, to copolymerize, for example, olefins with polar, unsaturated monomers, but the incorporation of the comonomer is often nonuniform and the polymer structure is branched, which leads, for example, to lower polymer film quality.

These characteristics restrict the field of application of the resulting polymers obtained by the various polymerization processes and it is therefore desirable to seek alternative polymers or polymerization processes which do not have said disadvantages or have them only to a subordinate degree.

EP-A 0 589 527 describes catalyst systems for olefin homopolymerization and olefin copolymerization which are based on specific palladium phosphine complexes. However, both the preparative accessibility and the polymerization behavior of these catalysts leave something to be desired. Thus, only low degrees of polymerization (oligomers having from 3 to 20 monomer units) are obtained in polar solvents such as methanol, ethylene glycol or water. In nonpolar solvents such as diethylene glycol dimethyl ether (diglyme) too, maximum molecular weights Mn of only 5600 are achieved, with only traces of the comonomer being incorporated. The use of internal olefins is also not described, and the double bond content of the polymers and their molecular weight distribution Mw/Mn is likewise not disclosed.

EP-A 0 454 231 describes catalyst systems for the polymerization of ethylene, olefins and alkynes which are based on cationic metal complexes of late transition metals (group VIII). However, these catalysts are very sensitive to impurities. The achievable roductivities likewise leave something to be desired. No polar opolymers are described.

It is an object of the present invention to provide a novel polyerization process which does not have the disadvantages indiated and which, in particular, also leads to copolymers having polar comonomers incorporated in a predominantly linear sequence.

We have found that this object is achieved by a process for preparing polymers of olefinically unsaturated monomers by polymerzation of unsaturated monomers in the presence of a metal comlex of the general formula (I)

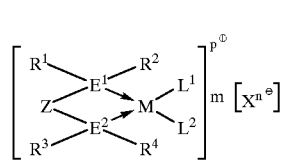

where the substituents and indices have the following meanings:

M is a metal from group VIIIB of the Periodic Table of the Elements, $E^1$, $E^2$ are each an element from group VA of the Periodic Table of the Elements, Z is a bridging structural unit having a bridging atom from group IVA, VA or VIA of the Periodic Table of the Elements, $R^1$ to $R^4$ are substituents selected from the group consisting of $C_1$–$C_{20}$-organic and $C_3$–$C_{30}$-organosilicon radicals, where the radicals can contain one or more elements of groups IVA, VA, VIA and VIIA of the Periodic Table of the Elements, $L^1$, $L^2$ are formally charged or neutral ligands, X is a monovalent or polyvalent anion, p is 0, 1 or 2, m, n are 0, 1 or 2, where p=m×n.

Suitable metals M of the metal complexes used in the polymerization process of the present invention are the metals of group VIIIB of the Periodic Table of the Elements, ie. iron, cobalt and nickel and especially the platinum metals such as ruthenium, rhodium, osmium, iridium, platinum and, very particularly, palladium. In the complexes, the metals can be formally uncharged, formally singly positively charged or formally doubly positively charged.

These catalysts were known in the prior art as was their method of preparation. See Herwig et al., *Inorganica Chimica Acta*, 222 (1994) 381–385; Xu et al., *Makromol. Chem.*, 194 (1993) 2579–2603.

Suitable elements $E^1$ and $E^2$ are the elements of main group V of the Periodic Table of the Elements (group VA), ie. nitrogen, phosphorus, arsenic, antimony or bismuth. Particularly suitable are nitrogen or phosphorus, in particular phosphorus. The chelate compound can contain different elements $E^1$ and $E^2$, for example nitrogen and phosphorus.

The bridging structural unit Z is an atom group which connects the two elements $E^1$ and $E^2$ to one another. One atom from group IVA, VA or VIA of the Periodic Table of the Elements forms the connecting bridge between $E^1$ and $E^2$. Possible free valences of this bridge atom can be satisfied in a variety of ways, for example by substitution with hydrogen, elements from group IVA, VA, VIA or VIIA of the Periodic Table of the Elements. These substituents can also form a ring with the bridge atom.

Well suited bridging structural units are those containing one element from group IVA of the Periodic Table of the Elements, for example methylene (—$CH_2$—), ethylidene ($CH_3(H)C=$), 2-propylidene (($CH_3)_2C=$) or diphenylmethylene (($C_6H_5)_2C=$).

Particularly suitable bridging structural units which may be mentioned are those such as —$CR^5R^6$— or —$SiR^5R^6$—, where $R^5$ and $R^6$ are each hydrogen or a $C_1$–$C_{10}$-organic radical. $R^5$ and $R^6$ can also, together with the bridge atom, form a 3- to 10-membered ring. Examples which may be mentioned of single-atom bridging structural units are methylene (—$CH_2$—), ethylidene ($CH_3(H)C=$), 2-propylidene (($CH_3)_2C=$), diphenylmethylene (($C_6H_5)_2C=$), dialkylsilylene such as dimethylsilylene, diphenylsilylene; and as cyclic bridge members cyclopropylidene, cyclobutylidene, cyclopentylidene, cyclohexylidene. Preferred bridging structural units are methylene (—$CH_2$—), ethylidene ($CH_3(H)C=$), 2-propylidene (($CH_3)_2C=$), dimethylsilylene, diphenylsilylene, in particular methylene.

Suitable organic radicals $R^1$ to $R^4$ are aliphatic, cycloaliphatic and aromatic radicals having from 1 to 20 carbon atoms, for example the methyl, ethyl, 1-propyl, 1-butyl, 1-pentyl, 1-hexyl and 1-octyl groups. Also suitable are linear arylalkyl groups having from 1 to 10 carbon atoms in the alkyl radical and from 6 to 20 carbon atoms in the aryl radical, for example benzyl, and also aryl radicals such as phenyl, tolyl and other substituted phenyl groups. The radicals $R^1$ to $R^4$ should preferably be sufficiently bulky to substantially screen the central atom, eg. the palladium atom, with which the atoms $E^1$ and $E^2$ form the active complex. Radicals which meet this requirement are, for example, cycloaliphatic radicals and also branched aliphatic radicals, particularly those branched in the a position.

Suitable cycloaliphatic radicals are the cyclopentyl, cyclohexyl and menthyl groups and also, in particular, bicyclic radicals such as the norbornyl, pinanyl, bornyl and bicyclononyl groups with the ring framework being linked in any manner to the atoms $E^1$ and $E^2$. The cycloaliphatic radicals preferably contain a total of from 5 to 20 carbon atoms.

Suitable branched aliphatic radicals are $C_3$–$C_{20}$-alkyl, preferably $C_3$–$C_{12}$-alkyl, radicals such as the iso-propyl, iso-butyl, sec-butyl, neopentyl and tert-butyl groups, also alkylaryl having from 1 to 10 carbon atoms in the alkyl radical and from 6 to 20 carbon atoms in the aryl radical.

Particular preference is given to the tert-butyl group, the iso-propyl group, the sec-butyl group and the menthyl group.

Alkyl groups having branching further out are also well suited as substituents $R^1$ to $R^4$, for example the iso-butyl, 3-methylbut-2-yl and 4-methylpentyl groups.

According to observations up to now, the chemical nature of the radicals $R^1$ to $R^4$ is not of decisive importance, ie. the radicals can also contain atoms of group IVA, VA, VIA or VIIA of the Periodic Table of the Elements, for example halogen, oxygen, sulfur, nitrogen, silicon, the latter for example as the bis(trimethylsilyl)methyl group. Functional groups such as hydroxyl, alkoxy and cyano which are inert under the polymerization conditions are also suitable in this context.

Preferred heterosubstituents $R^1$ to $R^4$ are $C_3$–$C_{30}$-organosilicon radicals, ie. tetravalent silicon atoms which are bonded to $E^1$ or $E^2$ and whose remaining valences are satisfied by three organic radicals, with the sum of carbon atoms in these three radicals bonded to silicon being in the range from three to thirty. Examples which may be mentioned are the trimethylsilyl, tert-butyldimethylsilyl and triphenylsilyl groups, in particular the trimethylsilyl group.

Preferred chelating ligands are diphosphines which are bridged with a methylene group; particular preference is given to methylene-bridged diphosphines substituted by $C_3$–$C_{10}$-cycloaliphatic or branched $C_3$–$C_{20}$-aliphatic radicals $R^1$ to $R^4$, for example bis(di-tert-butylphosphino) methane, [(di-tert-butylphosphino)(dicyclohexylphosphino)]methane or bis (dicyclohexylphosphino)methane whose good suitability for the process of the present invention is at present attributed to the methylene linkage of the two phosphorus atoms and the three-dimensional structure of the radicals $R^1$ to $R^4$.

A very particularly preferred chelating ligand is bis(di-tert-butylphosphino)methane.

Depending on the formal oxidation state of the central metal M, the ligands $L^1$ and $L^2$ bear one or two formal negative charges, or, if the metal is formally uncharged, the ligands $L^1$ and $L^2$ are likewise formally uncharged.

The chemical nature of the ligands is not critical. According to the present state of knowledge, they have the function of stabilizing the remainder of the metal complex against decomposition, for example precipitation of the metal or unspecific reactions, for example aggregation of the complex fragments.

Suitable formally charged inorganic ligands $L^1$, $L^2$ are halides, sulfates, phosphates or nitrates.

Preference is given to using halides such as chlorides, bromides and iodides, in particular chlorides.

Suitable formally charged organic ligands $L^1$, $L^2$ are $C_1$–$C_{20}$-aliphatic, $C_3$–$C_{30}$-cycloaliphatic, $C_7$–$C_{20}$-aralkyl radicals having a $C_6$–$C_{10}$-aryl radical and a $C_1$–$C_{10}$-alkyl radical, and $C_6$–$C_{20}$-aromatic radicals, for example methyl, ethyl, propyl, iso-propyl, tert-butyl, neo-pentyl, cyclohexyl, benzyl, neophyl, phenyl and substituted phenyl radicals.

Further suitable formally charged organic ligands $L^1$, $L^2$ are $C_1$–$C_{20}$-carboxylates such as acetate, propionate, oxalate, benzoate, citrate and salts of organic sulfonic acids such as methylsulfonate, trifluoromethylsulfonate, p-toluenesulfonate.

Preference is given to using $C_{1-C_7}$-carboxylates, sulfonic acid derivatives and, in particular, acetate and p-toluenesulfonate.

Suitable formally uncharged ligands $L^1$, $L^2$ are generally Lewis bases, ie. compounds having a free electron pair. Particularly well suited are Lewis bases whose free electron pair or pairs is/are located on a nitrogen or oxygen atom, ie. for example nitriles, R—CN, ketones, ethers, alcohols. Preference is given to using $C_1$–$C_{10}$-nitriles such as acetonitrile, propionitrile, benzonitrile or $C_2$–$C_{10}$-ketones such as acetone, acetylacetone or else $C_2$–$C_{10}$-ethers such as dimethyl ether, diethyl ether, tetrahydrofuran. Particular preference is given to using acetonitrile or tetrahydrofuran.

Depending on the formal charge on the complex fragment containing the metal M, the metal complex (I) contains anions. If the M-containing complex fragment is formally uncharged, the complex contains no anion X.

The chemical nature of the anions X is not critical. According to the present state of knowledge, however, it is advantageous for them to have as little nucleophilic nature as possible, ie. have as low as possible a tendency to form a chemical bond to the central metal M. Suitable anions X are, for example, perchlorate, sulfate, phosphate, nitrate and carboxylates such as acetate, trifluoroacetate, trichloroacetate, propionate, oxalate, citrate, benzoate, and also conjugated anions of organosulfonic acids such as methylsulfonate, trifluoromethylsulfonate and para-toluenesulfonate, also tetrafluoroborate, tetraphenylborate, tetrakis(pentafluorophenyl)borate, hexafluorophosphate, hexafluoroarsenate or hexafluoroantimonate. Preference is given to using perchlorate, trifluoroacetate, sulfonates such as methylsulfonate, trifluoromethylsulfonate, p-toluenesulfonate, tetrafluoroborate or hexafluorophosphate, in particular trifluoroacetate, perchlorate or p-toluenesulfonate.

Suitable olefinically unsaturated compounds are essentially all monomers of this class of compounds.

Particularly suitable are ethylene and $C_3$–$C_{10}$-alk-1-enes such as propylene, 1-butene, 1-pentene, 1-hexene, 1-heptene, 1-octene, 1-nonene and 1-decene. It is also possible to use internal E- or Z-olefins such as 2-butene, 2-pentene, 2- and 3-hexene with good effect; other suitable monomers are dienes such as 1,3-butadiene, 1,4-hexadiene, 1,5-hexadiene, and also cycloolefins such as cyclopentene, cyclohexene, norbornene and norbornadiene, cyclopentadiene and dicyclopentadiene.

Suitable olefinically unsaturated aromatic monomers are, in particular, styrene and a-methylstyrene. Olefins substituted by functional groups are also particularly important as monomers. Suitable functional groups are the carboxyl group, —COOH, and its derivatives such as esters, halides and amides, also the hydroxyl group, the cyano group, —CN, keto group, aldehyde group and carboxylate group, and also the silyl group, —SiR$_3$, where R is hydrogen or an organic radical having from 1 to 15 carbon atoms.

Particularly suitable olefins substituted by functional groups are acrylic acid and methacrylic acid and their derivatives, particularly the nitriles, amides and $C_1$–$C_{10}$-alkyl esters, for example acrylonitrile, methacrylonitrile, methyl acrylate, ethyl acrylate, propyl acrylate, butyl acrylate, tert-butyl acrylate, 2-ethylhexyl acrylate, methyl methacrylate, ethyl methacrylate, propyl methacrylate. Further suitable monomers are vinyl chloride, vinyl acetate, vinyl propionate, maleic anhydride and N-vinylpyrrolidone.

Of course, it is also possible to use mixtures of various monomers.

The molar ratio between the different monomers can largely be selected freely.

The polymerization conditions are not critical per se. The polymerizations can be carried out either batchwise or continuously.

Pressures of from 100 to 500,000 kPa, preferably from 200 to 350,000 kPa and in particular from 500 to 30,000 kPa, temperatures of from −50 to 400° C., preferably from 20 to 250° C. and in particular from 40 to 150° C., have been found to be suitable.

Polymerization reactions using the catalyst systems disclosed can be carried out in the gas phase, in suspension, in liquid and in supercritical monomers and in solvents which are inert under the polymerization conditions.

Suitable inert solvents are alcohols such as methanol, ethanol, propanol, i-propanol, 1-butanol and tert-butanol, sulfoxides and sulfones, for example dimethyl sulfoxide, esters such as ethyl acetate and butyrolactone, ethers such as tetrahydrofuran, the dimethyl ether of ethylene glycol and diisopropyl ether, and also aromatic solvents such as benzene, toluene, ethylbenzene or chlorobenzene or mixtures of these.

The molecular weight of the polymers can be regulated in a customary manner by varying the polymerization temperature and by the addition of hydrogen.

The polymers prepared using the process of the present invention generally have a high molecular weight, a narrow molecular weight distribution and a high proportion of double bonds.

The polymers are suitable for producing moldings, in particular moldings for packaging, and also films, fibers and coupling agents and can easily be chemically modified owing to their reactive double bonds.

Examples 1 to 4

A 0.3 l autoclave was charged with 75 ml of the solvent (methanol in Examples 1 and 4, toluene in Examples 2 and 3) and the appropriate palladium complex (see Table 1). At the desired temperature, the autoclave was then pressurized with ethylene up to a total pressure of 6000 kPa (see Table 1) and polymerization was carried out for 5 hours. The reaction temperature and the pressure were kept constant during the entire reaction time, after which the polymerization was stopped by cooling and venting the autoclave, the reaction mixture was filtered and the polymer was isolated.

The process parameters, amounts of catalyst and solvent used and also the amounts of polymer obtained and their melting points (determined by the DSC method) are shown in Table 1.

Explanation of the abbreviations:

dtbpm=bis(di-tert-butylphosphino)methane
MeCN=acetonitrile

TABLE

Process parameters, polymer properties

| Example | Catalyst/(mmol) | Temperature [° C.] | Yield [g] | Melting point [° C.] |
|---------|---|---|---|---|
| 1 | [(dtbpm)Pd(MeCN)$_2$] (CF$_3$CO$_2$)$_2$ | 85 | 2 | 105 |
| 2 | [(dtbpm)Pd(MeCN)$_2$] (ClO$_4$)$_2$ | 70 | 1.5 | 146 |
| 3 | [(Ph$_2$P(CH$_2$)$_3$PPh$_2$)Pd(MeCN)$_2$] (ClO$_4$)$_2$ | 70 | 0.5 | 143 |
| 4 | [(dtbpm)Pd(MeCN)$_2$] (CF$_3$SO$_3$)$_2$ | 50 | 0.8 | 122 |

We claim:

1. A process for preparing polymers consisting of olefinically unsaturated monomers by polymerization of unsaturated monomers in the presence of a catalyst consisting essentially of a metal complex of the general formula (I)

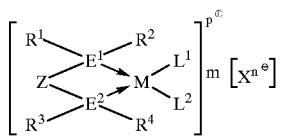

(I)

where the substituents and indices have the following meanings:

M is a metal from group VIIIB of the Periodic Table of the Elements, $E^1$, $E^2$ are each an element from group VA of the Periodic Table of the Elements, Z is a single atom bridging unit which connects the two elements $E^1$ and $E^2$ to one another, the bridging atom being selected from group IVA, VA or VIA of the Periodic Table of the Elements, $R^1$ to $R^4$ are substituents selected from the group consisting of $C_1$–$C_{20}$-organic and $C_3$–$C_{30}$-organosilicon radicals, where the radicals can contain one or more elements of groups IVA, VA, VIA and VIIA of the Periodic Table of the Elements and may be substituted with functional groups which are inert under polymerization conditions, $L^1$, $L^2$ are halide, sulfate, phosphate, nitrate, methyl, ethyl, propyl, isopropyl, tert-butyl, neopentyl, cyclohexyl, benzyl, neophyl, phenyl, acetate, p-toluenesulfonate, acetonitrile, propionitrile, benzonitrile, dimethyl ether, ethyl ether or tetrahydrofurane, X is a monovalent or polyvalent anion, P is 0, 1 or 2, m, n are 0, 1 or 2, where p=m×n.

2. A process as claimed in claim 1, wherein the polymerization is carried out in the presence of a metal complex of the formula (I) in which Z is a methylene group.

3. A process as claimed in claim 1, wherein the polymerization is carried out in the presence of a metal complex of the formula (I) in which X is trifluoroacetate, perchlorate or p-toluenesulfonate.

4. A process as claimed in any of claim 1, wherein the olefinically unsaturated compounds used are olefins, diolefins or olefins substituted by functional groups, or vinylaromatics.

5. A process as claimed in any of claim 1, wherein the olefinically unsaturated compounds used are $C_2$–$C_{20}$-alk-1-enes, internal $C_4$–$C_{20}$-alkenes, $C_4$–$C_{20}$-diolefins or α,β-unsaturated carboxylic acids or their derivatives.

* * * * *

UNITED STATES PATENT AND TRADEMARK OFFICE
CERTIFICATE OF CORRECTION

PATENT NO.: 6,031,057

DATED: February 29, 2000

INVENTOR(S): LIPPERT et al.

It is certified that error appears in the above-identified patent and that said Letters Patent is hereby corrected as shown below:

Col. 8, claim 4, line 31, delete "any of".

Col. 8, claim 5, line 35, delete "any of".

Signed and Sealed this

Ninth Day of January, 2001

Attest:

Attesting Officer

Q. TODD DICKINSON

Commissioner of Patents and Trademarks